(12) United States Patent
Mintz et al.

(10) Patent No.: US 8,527,390 B1
(45) Date of Patent: Sep. 3, 2013

(54) SYSTEMS AND METHODS FOR MULTIPLIER-ADJUSTED LEAN LEVELS FOR TRADING STRATEGIES

(75) Inventors: Sagy Pundak Mintz, Lincolnshire, IL (US); Michael J. Burns, Riverside, IL (US)

(73) Assignee: Trading Technologies International, Inc., Chicago, IL (US)

( * ) Notice: Subject to any disclaimer, the term of this patent is extended or adjusted under 35 U.S.C. 154(b) by 582 days.

(21) Appl. No.: 12/410,759

(22) Filed: Mar. 25, 2009

(51) Int. Cl.
*G06Q 40/00* (2012.01)
(52) U.S. Cl.
USPC .............................. 705/37; 705/35
(58) Field of Classification Search
CPC ...................................... G06Q 40/06
USPC .................................. 705/35–40
See application file for complete search history.

(56) References Cited

U.S. PATENT DOCUMENTS

| | | |
|---|---|---|
| 7,389,264 B2 | 6/2008 | Kemp, II et al. |
| 7,392,219 B2 | 6/2008 | Singer et al. |
| 7,424,450 B2 | 9/2008 | Kemp, II et al. |
| 7,437,325 B2 | 10/2008 | Kemp, II et al. |
| 7,542,940 B2 | 6/2009 | Burns et al. |
| 7,729,978 B2 | 6/2010 | Mintz et al. |
| 7,774,261 B1 | 8/2010 | Mintz et al. |
| 7,774,262 B1 | 8/2010 | Mintz et al. |
| 7,813,995 B2 | 10/2010 | Burns et al. |
| 7,904,370 B2 | 3/2011 | Singer et al. |
| 7,974,909 B1 * | 7/2011 | Tresenriter ............... 705/37 |
| 8,032,445 B2 | 10/2011 | Mintz et al. |
| 8,180,692 B2 | 5/2012 | Kemp, II et al. |
| 8,239,314 B2 | 8/2012 | Burns et al. |
| 8,249,977 B2 | 8/2012 | Kontos et al. |

(Continued)

FOREIGN PATENT DOCUMENTS

| | | |
|---|---|---|
| AU | 2008232974 B2 | 5/2011 |
| AU | 2011202332 B2 | 1/2013 |

(Continued)

OTHER PUBLICATIONS

Unpublished U.S. Appl. No. 12/751,269, filed Mar. 31, 2010, with inventors Mintz, et al., entitled "System and Method for Use of Fractional Pay-Up Ticks in Relation to Trading Strategies in an Electronic Trading Environment".

(Continued)

*Primary Examiner* — Eric T Wong
*Assistant Examiner* — Edward Baird
(74) *Attorney, Agent, or Firm* — McDonnell Boehnen Hulbert & Berghoff LLP

(57) ABSTRACT

Certain embodiments provide a method for trading in an electronic trading environment including receiving market data relating to a plurality of tradable objects; sending a order to an exchange for the first tradable object at a quoted price; receiving a fill confirmation for the quoting order at a filled price; determining a difference between the quoted price and the filled price; determining a hedge price for each of the plurality of tradable objects other than the first tradable object based at least in part on the difference and at least one multiplier associated with at least one leg of the trading strategy; and sending hedge orders for each of the plurality of tradable objects other than the first tradable object at the corresponding hedge price. The plurality of tradable objects includes at least a first, second, and third tradable object, which are traded as legs of a trading strategy.

10 Claims, 7 Drawing Sheets

(56) References Cited

U.S. PATENT DOCUMENTS

| | | |
|---|---|---|
| 8,280,801 B2 | 10/2012 | Mintz et al. |
| 8,386,368 B2 * | 2/2013 | Rooney .................. 705/37 |
| 8,401,959 B2 | 3/2013 | Mintz et al. |
| 8,417,621 B2 * | 4/2013 | Mintz et al. ............ 705/37 |
| 2002/0152153 A1 * | 10/2002 | Nakagawa .............. 705/37 |
| 2002/0161693 A1 * | 10/2002 | Greenwald ............. 705/37 |
| 2003/0236737 A1 * | 12/2003 | Kemp et al. ............ 705/37 |
| 2004/0267655 A1 * | 12/2004 | Davidowitz et al. .... 705/37 |
| 2006/0265314 A1 | 11/2006 | Singer et al. |
| 2007/0078752 A1 * | 4/2007 | Burns et al. ............ 705/37 |
| 2008/0177652 A1 * | 7/2008 | Weiss ...................... 705/37 |
| 2008/0288391 A1 * | 11/2008 | Downs et al. ........... 705/37 |
| 2009/0006244 A1 | 1/2009 | Kemp, II et al. |
| 2009/0228400 A1 | 9/2009 | Burns et al. |
| 2009/0299890 A1 | 12/2009 | Kontos et al. |
| 2010/0191641 A1 | 7/2010 | Mintz et al. |
| 2011/0145124 A1 * | 6/2011 | Rooney .................. 705/37 |
| 2011/0145165 A1 * | 6/2011 | Haldes et al. ........ 705/36 R |
| 2011/0313910 A1 | 12/2011 | Mintz et al. |
| 2012/0016784 A1 * | 1/2012 | Mintz et al. ............ 705/37 |
| 2012/0016785 A1 * | 1/2012 | Mintz ...................... 705/37 |
| 2012/0016786 A1 * | 1/2012 | Mintz et al. ............ 705/37 |
| 2012/0166330 A1 | 6/2012 | Kemp, II et al. |
| 2012/0271754 A1 | 10/2012 | Burns et al. |
| 2012/0284170 A1 | 11/2012 | Kontos et al. |

FOREIGN PATENT DOCUMENTS

| | | |
|---|---|---|
| AU | 2013201801 A1 | 4/2013 |
| EP | 1481350 A4 | 5/2005 |
| EP | 1833017 A1 | 9/2007 |
| EP | 1609105 A4 | 10/2008 |
| EP | 2320374 A3 | 5/2011 |
| EP | 2381412 A1 | 10/2011 |
| EP | 2130172 A4 | 1/2012 |
| SG | 176523 A1 | 12/2011 |
| SG | 155611 A1 | 3/2012 |
| WO | 03077061 A2 | 9/2003 |
| WO | 03077061 A3 | 4/2004 |
| WO | 2004092996 A1 | 10/2004 |
| WO | 2005089495 A2 | 9/2005 |
| WO | 2005089495 A3 | 6/2007 |
| WO | 2008121516 A1 | 10/2008 |
| WO | 2009146363 A1 | 12/2009 |

OTHER PUBLICATIONS

Unpublished U.S. Appl. No. 13/760,285, filed Feb. 6, 2013, with inventors Mintz, et al., entitled "System and Method for Dynamically Changing an Electronic Trade Order Quantity".

* cited by examiner

|  | Multiplier | Lean Price | Market | Best Fit | Lean Prices | Last Legs | Simple MALL | Advanced MALL |
|---|---|---|---|---|---|---|---|---|
| Leg 1 (Filled) | 9 | 100 | 90 |  |  |  |  |  |
| Leg 2 | -2 | 100 | 91 | 91 | 100 | 91 | 90 | 91 |
| Leg 3 | -2 | 100 | 91 | 91 | 100 | 91 | 90 | 91 |
| Leg 4 | -2 | 100 | 90 | 92 | 100 | 90 | 90 | 91 |
| Leg 5 | -2 | 100 | 90 | 90 | 100 | 90 | 90 | 91 |
| Leg 6 | -1 | 100 | 82 | 82 | 100 | 86 | 90 | 82 |
| # of Legged Legs |  |  |  | 1 | 5 | 1 | 1 | 2 |
| Total Ticks Missed |  |  |  | 2 | 56 | 4 | 8-1-1 (6) | 2 |
| Maximum Ticks Missed |  |  |  | 2 | 18 | 4 | 8 | 1 |

| | Multiplier | Lean Price | Market (Actual) | Market Snapshot | Best Fit | Lean Prices | Last Legs | Simple MALL | Advanced MALL |
|---|---|---|---|---|---|---|---|---|---|
| Leg 1 (Filled) | 9 | 100 | 90 | | | | | | |
| Leg 2 | -2 | 100 | 91 | 92 | 96 | 100 | 92 | 90 | 91 |
| Leg 3 | -2 | 100 | 91 | 92 | 92 | 100 | 92 | 90 | 91 |
| Leg 4 | -2 | 100 | 90 | 92 | 92 | 100 | 92 | 90 | 91 |
| Leg 5 | -2 | 100 | 90 | 92 | 92 | 100 | 92 | 90 | 91 |
| Leg 6 | -1 | 100 | 82 | 82 | 82 | 100 | 74 | 90 | 82 |
| | | | | # of Legged Legs | 4 | 5 | 4 | 1 | 2 |
| | | | | Total Ticks Missed | 10 | 56 | 6-8 (2) | 8-1-1 (6) | 2 |
| | | | | Maximum Ticks Missed | 5 | 18 | 2 | 8 | 1 |

Figure 5

SYSTEMS AND METHODS FOR MULTIPLIER-ADJUSTED LEAN LEVELS FOR TRADING STRATEGIES

BACKGROUND

The present invention is directed towards electronic trading systems. More particularly, certain embodiments of the present invention are directed towards using multiplier-adjusted lean levels for trading strategies in electronic trading systems.

An electronic trading system provides for electronically matching orders to buy and sell items to be traded. The items may include, for example, stocks, options, and commodities. Typically, an electronic exchange in the electronic trading system is used to match the orders. In addition, the electronic exchange provides market data to various client devices in the electronic trading system used by traders to place the orders. For example, the electronic exchange may provide market data such as prices for various items available for trading and trade confirmations indicating what trades have occurred at what quantities and/or prices.

In addition to trading single items, a trader may trade more than one item according to a trading strategy. One common trading strategy is a spread and trading according to a trading strategy may also be referred to as spread trading. Spread trading may attempt to capitalize on changes or movements in the relationships between the items in the trading strategy, for example.

A trading strategy may define a relationship between two or more items to be traded. Each item in a trading strategy may be referred to as a leg of the trading strategy. Once defined, items in the trading strategy may then be traded together according to the defined relationship.

Generally, when a leg of the trading strategy is filled (that is, an order for the item of the leg is matched), the remaining legs should be quoted at particular prices to maintain the defined relationship of the trading strategy. These prices may be referred to as hedge prices, for example. When the number of items in the trading strategy is greater than two, multiple sets of hedge prices can be chosen from to maintain the defined relationship. That is, there are numerous hedge prices that may be selected for each leg in order to meet the requirements of the trading strategy. Current systems employ a variety of techniques to choose one of the sets of hedge prices to use. However, each technique has disadvantages.

SUMMARY

Certain embodiments of the present invention provide a method for trading in an electronic trading environment including receiving by a computing device market data relating to a plurality of tradable objects; sending by the computing device a quoting order to an electronic exchange for the first tradable object at a quoted price; receiving by the computing device a fill confirmation for the quoting order for the first tradable object at a filled price; determining by the computing device a difference between the quoted price and the filled price; determining by the computing device a hedge price for each of the plurality of tradable objects other than the first tradable object based at least in part on the difference and at least one multiplier associated with at least one leg of the trading strategy; and sending by the computing device hedge orders for each of the plurality of tradable objects other than the first tradable object at the corresponding hedge price. The plurality of tradable objects includes at least a first tradable object, a second tradable object, and a third tradable object. The tradable objects are traded as legs of a trading strategy. The trading strategy includes a multiplier associated with each leg. The filled price is different from the quoted price.

Certain embodiments of the present invention provide a system for trading in an electronic trading environment including a market data processing component, a fill confirmation processing component, and a strategy processing component. The market data processing component is adapted to receive market data relating to a plurality of tradable objects. The plurality of tradable objects includes at least a first tradable object, a second tradable object, and a third tradable object. The tradable objects are traded as legs of a trading strategy. The trading strategy includes a multiplier associated with each leg. The fill confirmation processing component is adapted to receive a fill confirmation for a quoted order at a quoted price for the first tradable object at a filled price. The filled price is different from the quoted price for the first tradable object. The strategy processing component is adapted to determine a difference between the quoted price and the filled price. The strategy processing component is further adapted to determine a hedge price for each of the plurality of tradable objects other than the first tradable object based at least in part on the difference and at least one multiplier associated with at least one leg of the trading strategy. The strategy processing component is further adapted to send hedge orders for each of the plurality of tradable objects other than the first tradable object at the corresponding hedge price.

Certain embodiments of the present invention provide a computer readable medium having stored therein instructions for execution on a computer to perform the following method steps: receiving by a computing device market data relating to a plurality of tradable objects; sending by the computing device a quoting order to an electronic exchange for the first tradable object at a quoted price; receiving by the computing device a fill confirmation for the quoting order for the first tradable object at a filled price; determining by the computing device a difference between the quoted price and the filled price; determining by the computing device a hedge price for each of the plurality of tradable objects other than the first tradable object based at least in part on the difference and at least one multiplier associated with at least one leg of the trading strategy; and sending by the computing device hedge orders for each of the plurality of tradable objects other than the first tradable object at the corresponding hedge price. The plurality of tradable objects includes at least a first tradable object, a second tradable object, and a third tradable object. The tradable objects are traded as legs of a trading strategy. The trading strategy includes a multiplier associated with each leg. The filled price is different from the quoted price.

Other embodiments of the present invention are described below. In addition, modifications may be made to the described embodiments without departing from the spirit or scope of the invention.

BRIEF DESCRIPTION OF THE DRAWINGS

Example embodiments are described herein with reference to the following drawings.

FIG. 5 illustrates a table showing example results for different hedging techniques.

Figure 1:
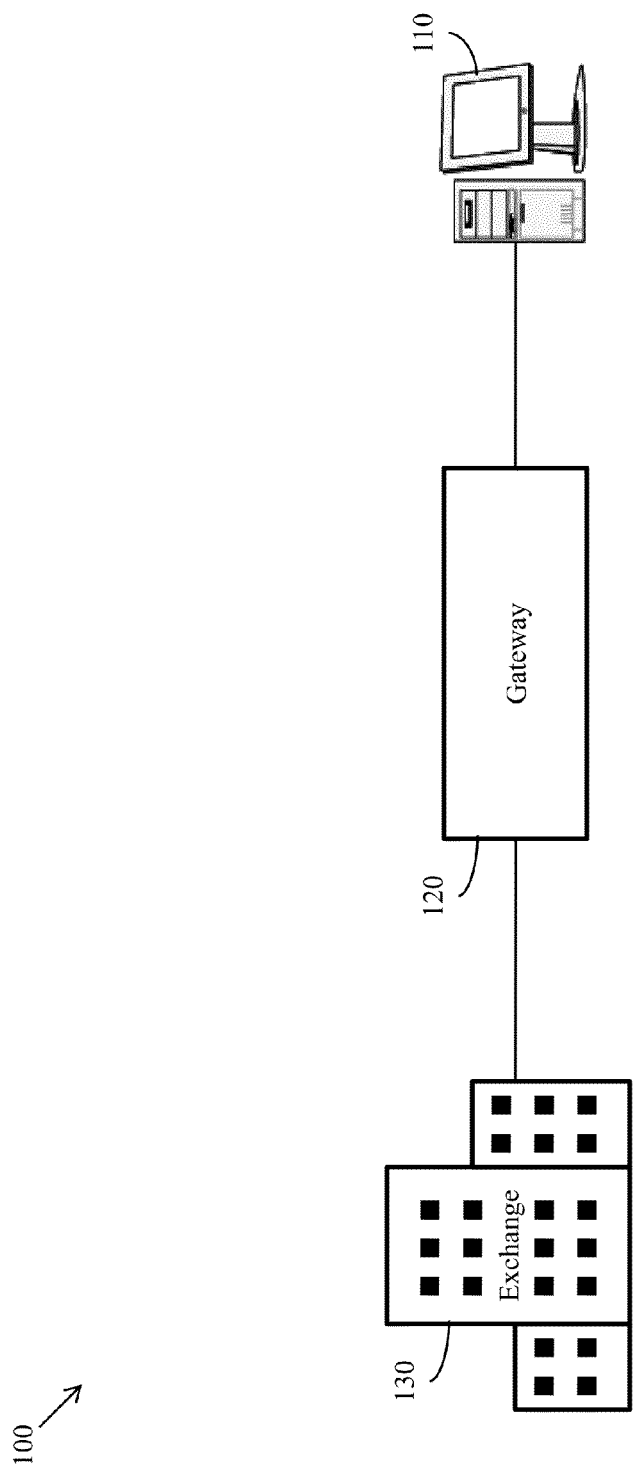
FIG. 1 illustrates an electronic trading system in which certain embodiments of the present invention may be employed.

The foregoing summary, as well as the following detailed description, will be better understood when read in conjunction with the drawings which show certain embodiments of the present invention. The drawings are for the purpose of illustrating certain embodiments, but it should be understood that the present invention is not limited to the arrangements and instrumentality shown in the drawings.

DETAILED DESCRIPTION

Certain embodiments of the present invention provide a Multiplier-Adjusted Lean Levels (MALL) technique to determine hedge prices for the remaining legs of a trading strategy once a leg of the trading strategy has been filled. In the MALL technique, if a quoting order for the trading strategy is filled at the expected price (that is, at the quoted price), then hedge orders may be submitted based on the lean prices corresponding to the quoted price. Alternatively, the hedge orders may be submitted based on other known techniques. However, if the fill occurs at a price other than the quoted price, then the hedge prices at which the unfilled legs are quoted to achieve the desired price for the trading strategy are calculated by adjusting the lean prices for the unfilled legs based at least in part on the difference between the quoted price and the filled price and the multipliers of the legs.

I. Example Electronic Trading System

FIG. 1 illustrates an electronic trading system 100 in which certain embodiments of the present invention may be employed. The system 100 includes a client device 110, a gateway 120, and an electronic exchange 130. The client device 110 is in communication with the gateway 120. The gateway 120 is in communication with the exchange 130.

In operation, the client device 110 may be utilized by a user to send orders to buy or sell tradable objects at the exchange 130. The orders are sent through the gateway 120 to the exchange 130. In addition, market data is sent from the exchange 130 through the gateway 120 to the client device 110. The user may also utilize the client device 110 to monitor this market data and base a decision to send an order for a tradable object on the market data.

A tradable object is anything which can be traded with a quantity and/or a price. For example, financial products such as stocks, options, bonds, futures, currency, warrants, funds derivatives, commodities, traded events, goods, and collections and/or combinations of these may be tradable objects. A tradable object may be "real" or "synthetic." A real tradable object includes products that are listed by an exchange. A synthetic tradable object includes products that are defined by the user and are not listed by an exchange. For example, a synthetic tradable object may include a combination of real (or other synthetic) products such as a synthetic spread created by a trader utilizing a client device 110.

The client device 110 may include one or more electronic computing platforms such as a hand-held device, laptop, desktop computer, workstation with a single or multi-core processor, server with multiple processors, and/or cluster of computers, for example.

The client device 110 may include one or more trading applications. The trading application(s) may, for example, process market data by arranging and displaying the market data in trading and charting windows. This processing may be based on user preferences, for example. The trading application(s) may include an automated trading tool such as an automated spread trading tool, for example.

The client device 110 may include an electronic trading workstation, a portable trading device, an algorithmic trading or "black-box" system, an embedded trading system, and/or an automated trading tool, for example. For example, the client device 110 may be a computing system running a copy of X_TRADER™, an electronic trading platform provided by Trading Technologies International, Inc. of Chicago, Ill. As another example, the client device 110 may be a computing device running the automated trading tool may Autospreader™, also provided by Trading Technologies International, Inc.

The client device 110 is adapted to send orders to buy or sell tradable objects. The client device 110 may also be adapted to cancel orders, change orders, and/or query an exchange, for example.

The orders sent by the client device 110 may be sent at the request from a user or automatically, for example. For example, a trader may utilize an electronic trading workstation to place an order for a particular tradable object, manually providing various parameters for the order such as an order price and/or quantity. As another example, an automated trading tool may calculate one or more parameters for an order and automatically send the order. In some instances, an automated trading tool may prepare the order to be sent but not actually send it without confirmation from the user.

In certain embodiments, the client device 110 includes a user interface. The user interface may include one or more display devices for presenting a text-based or graphical interface of a trading application to a user, for example. For example, the display devices may include computer monitors, hand-held device displays, projectors, and/or televisions. The user interface may be used by the user to specify or review parameters for an order using a trading application. The user interface may include one or more input devices for receiving input from a user, for example. For example, the input devices may include a keyboard, trackball, two or three-button mouse, and/or touch screen. The user interface may include other devices for interacting with a user. For example, information may be aurally provided to a user through a speaker and/or received through a microphone.

In certain embodiments, the orders from the client device 110 are sent to the exchange 130 through the gateway 120. The client device 110 may communicate with the gateway 120 using a local area network, a wide area network, a virtual private network, a T1 line, a T3 line, an ISDN line, a point-of-presence, and/or the Internet, for example.

The gateway 120 is adapted to communicate with the client device 110 and the exchange 130. The gateway 120 facilitates communication between the client device 110 and the exchange 130. For example, the gateway 120 may receive orders from the client device 110 and transmit the orders to the exchange 130. As another example, the gateway 120 may receive market data from the exchange 130 and transmit the market data to the client device 110.

In certain embodiments, the gateway 120 performs processing on data communicated between the client device 110 and the exchange 130. For example, the gateway 120 may process an order received from the client device 110 into a data format acceptable by the exchange 130. Similarly, the gateway 120 may transform market data in an exchange-specific format received from the exchange 130 into a format understood by the client device 110. The processing of the gateway 120 may also include tracking orders from the client device 110 and updating the status of the order based on fill confirmations received from the exchange 130, for example. As another example, the gateway 120 may coalesce market data from the exchange 130 and provide it to the client device 120.

In certain embodiments, the gateway 120 provides services other than processing data communicated between the client device 110 and the exchange 130. For example, the gateway 120 may provide risk processing.

The gateway 120 may include one or more electronic computing platforms such as a hand-held device, laptop, desktop computer, workstation with a single or multi-core processor, server with multiple processors, and/or cluster of computers, for example.

The gateway 120 may include one or more gateway applications. The gateway application(s) may, for example, handle order processing and market data processing. This processing may be based on user preferences, for example.

In certain embodiments, the gateway 120 communicates with the exchange 130 using a local area network, a wide area network, a virtual private network, a T1 line, a T3 line, an ISDN line, a point-of-presence, and/or the Internet, for example.

The exchange 130 is adapted to match orders to buy and sell tradable objects. The tradable objects may be listed for trading by the exchange 130. The orders may include orders received from the client device 110, for example. Orders may be received from the client device 110 through the gateway 120, for example. In addition, the orders may be received from other devices in communication with the exchange 130. That is, typically the exchange 130 will be in communication with a variety of other client devices (which may be similar to client device 110) that also provide orders to be matched.

The exchange 130 is adapted to provide market data. The market data may be provided to the client device 110, for example. The market data may be provided to the client device 110 through the gateway 120, for example. The market data may include data that represents the inside market, for example. The inside market is the lowest sell price (also referred to as the "best ask") and the highest buy price (also referred to as the "best bid") at a particular point in time. The market data may also include market depth. Market depth refers to the quantities available at the inside market and may also refer to quantities available at other prices away from the inside market. Thus, the inside market may be considered the first level of market depth. One tick away from the inside market may be considered the second level of market depth, for example. In certain embodiments, market depth is provided for all price levels. In certain embodiments, market depth is provided for less than all price levels. For example, market depth may be provided only for the first five price levels on either side of the inside market. The market data may also include information such as the last traded price (LTP), the last traded quantity (LTQ), and order fill information.

In certain embodiments, the system 100 includes more than one client device 110. For example, multiple client devices similar to the client device 110, discussed above, may be in communication with the gateway 120 to send orders to the exchange 130.

In certain embodiments, the system 100 includes more than one gateway 120. For example, multiple gateways similar to the gateway 120, discussed above, may be in communication with the client device 110 and the exchange 130. Such an arrangement may be used to provide redundancy should one gateway 120 fail, for example.

In certain embodiments, the system 100 includes more than one exchange 130. For example, the gateway 120 may be in communication with multiple exchanges similar to the exchange 130, discussed above. Such an arrangement may allow the client device 110 to trade at more than one exchange through the gateway 120, for example.

In certain embodiments, the client device 110 includes one or more computing devices or processing components. In other words, the functionality of the client device 110 may be performed by more than one computing device. For example, one computing device may generate orders to be sent to the exchange 130 while another computing device may provide a graphical user interface to a trader. In certain embodiments, the gateway 120 includes one or more computing devices or processing components. In other words, the functionality of the gateway 120 may be performed by more than one computing device. In certain embodiments, the exchange 130 includes one or more computing devices or processing components. In other words, the functionality of the exchange 130 may be performed by more than one computing device.

In certain embodiments, the gateway 120 is part of the client device 110. For example, the components of the gateway 120 may be part of the same computing platform as the client device 110. As another example, the functionality of the gateway 120 may be performed by components of the client device 110. In certain embodiments, the gateway 120 is not present. Such an arrangement may occur when the client device 110 does not need to utilize the gateway.

In certain embodiments, the gateway 120 is physically located at the same site as the client device 110. In certain embodiments, the gateway 120 is physically located at the same site as the exchange 130. In certain embodiments, the client device 110 is physically located at the same site as the exchange 130. In certain embodiments, the gateway 120 is physically located at a site separate from both the client device 110 and the exchange 130.

While not shown for the sake of clarity, in certain embodiments, the system 100 may include other devices that are specific to the communications architecture such as middleware, firewalls, hubs, switches, routers, exchange-specific communication equipment, modems, security managers, and/or encryption/decryption devices.

Figure 2:
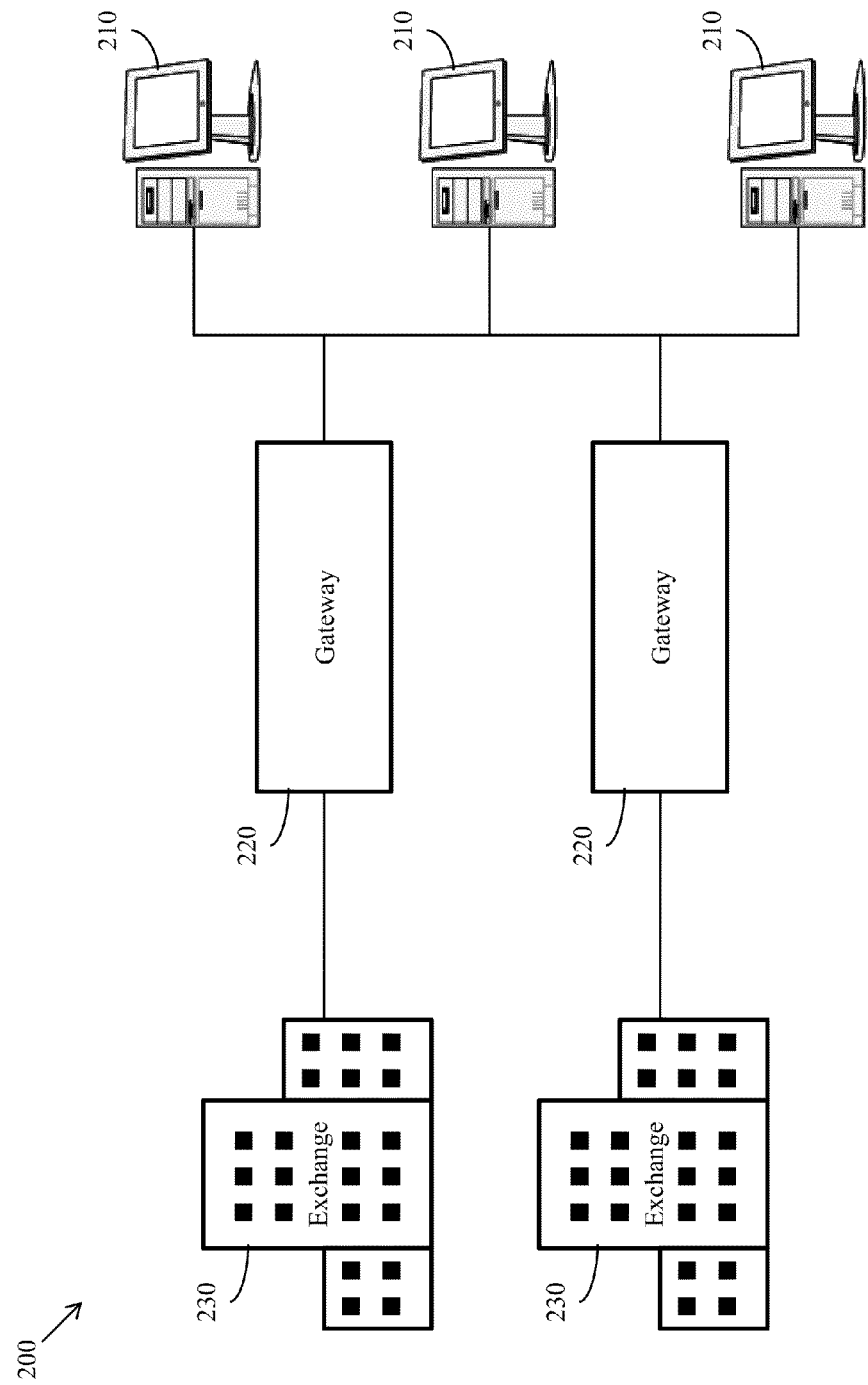
FIG. 2 illustrates an electronic trading system in which certain embodiments of the present invention may be employed.

FIG. 2 illustrates an electronic trading system 200 in which certain embodiments of the present invention may be employed. The system 200 includes one or more client devices 210, one or more gateways 220, and one or more electronic exchanges 230. The client devices 210 are in communication with one or more of the gateways 220. Each gateway 220 is in communication with a corresponding exchange 230.

One or more of the client devices 210 may be similar to the client device 110, discussed above, for example. One or more of the gateways 220 may be similar to the gateway 120, discussed above, for example. One or more of the exchanges 230 may be similar to the exchange 130, discussed above, for example.

In operation, a client device 210 may be utilized by a user to send orders to buy or sell tradable objects listed at different exchanges 230. The orders are sent through one or more of the gateways 220 to one or more of the exchanges 230. In addition, market data is sent from the exchanges 230 through the gateways 220 to one or more of the client devices 210. The user may also utilize a client device 210 to monitor this market data and base a decision to send an order for a tradable object on the market data.

In certain embodiments, a client device 210 is in communication with one of the gateways 220. In certain embodiments, a client device 210 is in communication with more than one of the exchanges 230.

In certain embodiments, a gateway 220 is in communication with one of the exchanges 230. In certain embodiments, a gateway 220 is in communication with more than one of the exchanges 230.

In certain embodiments, a client device 210 is adapted to communicate directly with one or more of the exchanges 230 and does not utilize a gateway 220.

The components, elements, and/or functionality of the systems 100 and/or 200 discussed above may be implemented alone or in combination in various forms in hardware, firmware, and/or as a set of instructions in software, for example. Certain embodiments may be provided as a set of instructions residing on a computer-readable medium, such as a memory, hard disk, CD-ROM, DVD, and/or EPROM, for execution on a general purpose computer or other processing device.

II. Strategy Trading

In addition to buying and/or selling a single tradable object, a trader may trade more than one tradable object according to a trading strategy. One common trading strategy is a spread and trading according to a trading strategy may also be referred to as spread trading. Spread trading may attempt to capitalize on changes or movements in the relationships between the tradable object in the trading strategy, for example.

A trader may utilize an automated trading tool to trade according to a trading strategy, for example. For example, the automated trading tool may Autospreader™ provided by Trading Technologies International, Inc. of Chicago, Ill.

A trading strategy defines a relationship between two or more tradable objects to be traded. Each tradable object being traded as part of a trading strategy may be referred to as a leg or outright market of the trading strategy.

When the trading strategy is to be bought, the definition for the trading strategy specifies which tradable object corresponding to each leg should be bought or sold. Similarly, when the trading strategy is to be sold, the definition specifies which tradable objects corresponding to each leg should be bought or sold. For example, a trading strategy may be defined such that buying the trading strategy involves buying one unit of a first tradable object for leg A and selling one unit of a second tradable object for leg B. Selling the trading strategy typically involves performing the opposite actions for each leg.

In addition, the definition for the trading strategy may specify a spread ratio associated with each leg of the trading strategy. The spread ratio may also be referred to as an order size for the leg. The spread ratio indicates the quantity of each leg in relation to the other legs. For example, a trading strategy may be defined such that buying the trading strategy involves buying 2 units of a first tradable object for leg A and selling 3 units of a second tradable object for leg B. The sign of the spread ratio may be used to indicate whether the leg is to be bought (the spread ratio is positive) or sold (the spread ratio is negative) when buying the trading strategy. In the example above, the spread ratio associated with leg A would be "2" and the spread ratio associated with leg B would be "−3."

In some instances, the spread ratio may be implied or implicit. For example, the spread ratio for a leg of a trading strategy may not be explicitly specified, but rather implied or defaulted to be "1" or "−1."

Additionally, the definition for the trading strategy may specify a multiplier associated with each leg of the trading strategy. The multiplier is used to adjust the price of the particular leg for determining the price of the spread. The multiplier for each leg may be the same as the spread ratio. For example, in the example above, the multiplier associated with leg A may be "2" and the multiplier associated with leg B may be "−3," both of which match the corresponding spread ratio for each leg. Alternatively, the multiplier associated with one or more legs may be different than the corresponding spread ratios for those legs. For example, the values for the multipliers may be selected to convert the prices for the legs into a common currency.

The following discussion assumes that the spread ratio and multipliers for each leg are the same, unless otherwise indicated. In addition, the following discussion assumes that the signs for the spread ratio and the multipliers for a particular leg are the same and, if not, the sign for the multiplier is used to determine which side of the trading strategy a particular leg is on.

Figure 3:
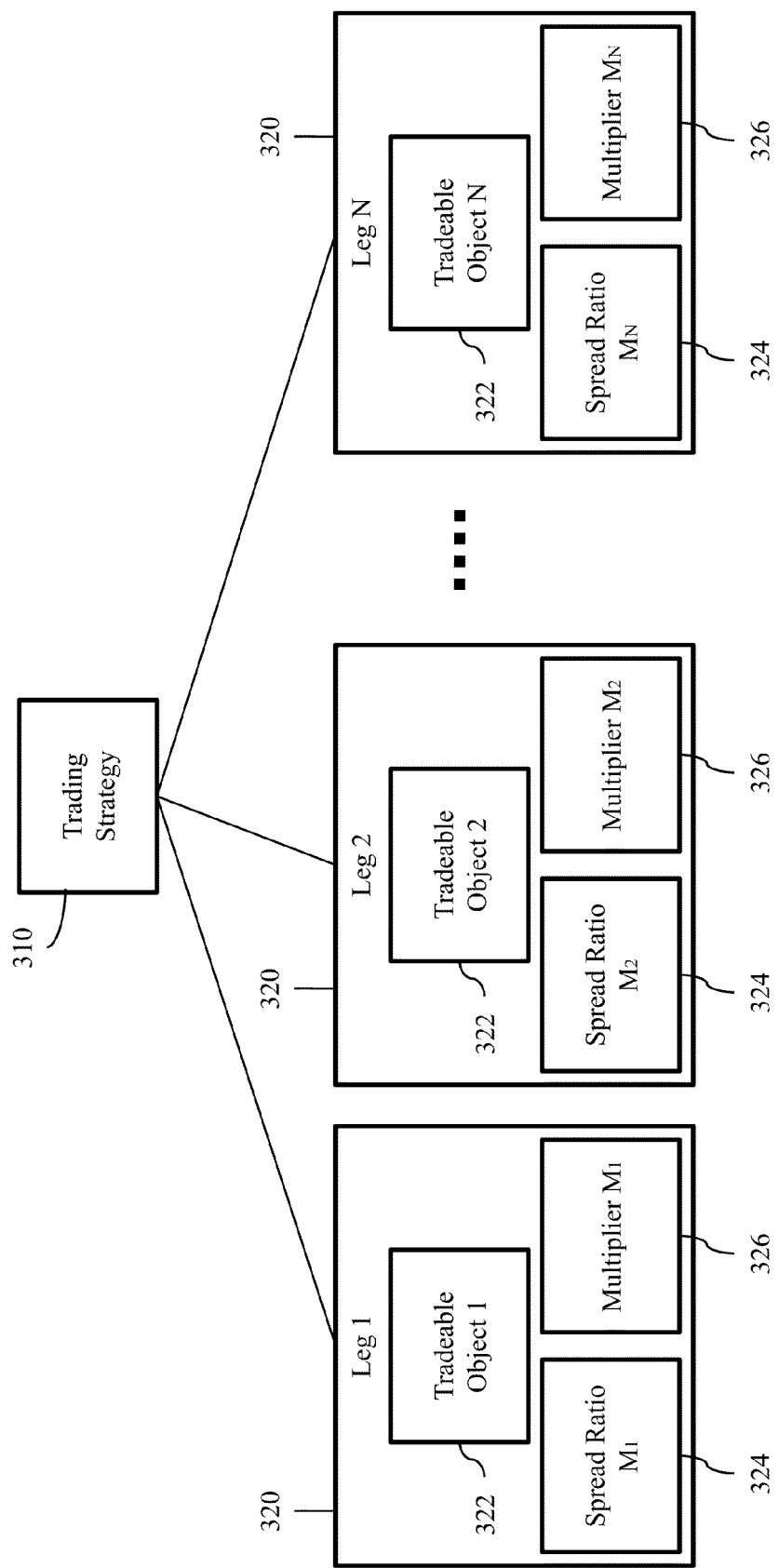
FIG. 3 illustrates a block diagram of a trading strategy which may be employed with certain embodiments of the present invention.

FIG. 3 illustrates a block diagram of a trading strategy 310 which may be employed with certain embodiments of the present invention. The trading strategy 310 includes "N" legs 320. The trading strategy 310 defines the relationship between the tradable objects 322 for each of the legs 320 using the spread ratios 324 and multipliers 326 associated with each of the legs 320.

Once defined, the tradable objects 322 in the trading strategy 310 may then be traded together according to the defined relationship. For example, assume that the trading strategy 310 is a spread with two legs 320. Leg 1 is for tradable object A and Leg 2 is for tradable object B. In addition, assume that the spread ratios 324 and multipliers 326 associated with Legs 1 and 2 are "1" and "−1," respectively. That is, the spread 310 is defined such that when the spread 310 is bought, 1 unit of tradable object A is bought (positive spread ratio, same direction as the spread) and 1 unit of tradable object B is sold (negative spread ratio, opposite direction of the spread). As mentioned above, typically in spread trading the opposite of the definition applies. That is, when the definition for the spread 310 is such that when the spread 310 is sold, 1 unit of tradable object A is sold (positive spread ratio, same direction as the spread) and 1 unit of tradable object B is bought (negative spread ratio, opposite direction of the spread).

The price for the trading strategy 310 is determined based on the definition. In particular, the price for the trading strategy 310 is typically the sum of price of the tradable object 322 multiplied by the multiplier 326 for each of the legs 320 of the trading strategy 310. This is illustrated in Equation 1:

$$\text{Strategy Price} = \Sigma_{i=1}^{N} \text{Mult}(i) * \text{Price}(i) \qquad \text{Eq. 1}$$

Mult(i) is the multiplier associated with leg i and Price(i) is the price for the tradable object for leg i. The price for a trading strategy may be affected by price tick rounding and/or pay-up ticks. However, both of these implementation details are beyond the scope of this discussion and are well-known in the art.

The discussion above applies whether the example spread is real or synthetic. Recall that, as discussed above, a real spread would be listed at an exchange, such as exchange 130 and/or 230, as a tradable product. In contrast, a synthetic spread would not be list as a product at an exchange, but rather the various legs of the spread are tradable at one or more exchanges. For the purposes of the following discussion, the trading strategy 310 is discussed as a synthetic trading strategy. However, similar techniques to those discussed below may also be applied by an exchange when a real trading strategy is being traded.

Continuing the example from above, if a trader believes that tradable object A typically has a price 10 greater than tradable object B, then the trader may want to buy the spread whenever the difference in price between tradable objects A and B is less than 10 and sell the spread whenever the difference is greater than 10. As an example, assume that tradable object A is at a price of 45 and tradable object B is at a price of 40. The current spread price, using Equation 1, would then be (1)(45)+(−1)(40)=5, which is less than the typical spread of 10. Thus, the trader may buy 1 unit of the spread, which results in buying 1 unit of tradable object A at a price of 45 and selling 1 unit of tradable object B at 40. At some later time, the typical price difference may be restored and the price of tradable object A is 42 and the price of tradable object B is 32. At this point, the price of the spread is now 10. If the trader sells 1 unit of the spread to close out his position (that is, sells 1 unit of tradable object A and buys 1 unit of tradable object B), he has made a profit on the total transaction. In particular, while the trader bought tradable object A at a price of 45 and sold at 42, losing 3, the trader sold tradable object B at a price of 40 and bought at 32, for a profit of 8. Thus, the trader made 5 on the buying and selling of the spread.

The above example assumes that there is sufficient liquidity and stability that the tradable objects can be bought and sold at the market price at approximately the desired times. This allows the trader to achieve the desired price for the spread 310. However, more generally, a trader determines a desired price at which to buy or sell a particular trading strategy. Then, an automated trading tool, for example, attempts to achieve that desired price by buying and selling the legs at appropriate prices. For example, when a trader enters an order to buy or sell the trading strategy 310 at a desired price, the automated trading tool may automatically place an order (also referred to as quoting an order) for one of the tradable objects 322 of the trading strategy 310 to achieve the desired price for the trading strategy (also referred to as a desired strategy price, desired spread price, and/or a target price). The leg for which the order is placed is referred to as the quoting leg. The other leg is referred to as a lean leg and/or a hedge leg. The price that the quoting leg is quoted at is based on the best price that an order could be filled at in the hedge leg. The best price is typically the best bid price when selling and the best ask price when buying. The best price in the hedge leg is also known as the leaned on price, lean price, or lean level. As the leaned on price changes, the price for the order in the quoting leg may also change in order to maintain the desired strategy price. When the quoting leg is filled, the automated trading tool may then submit an order in the hedge leg to complete the strategy. This order may be referred to as an offsetting or hedging order and is typically quoted at the leaned on price. If the order at the leaned on price is not filled (or filled sufficiently to achieve the desired strategy price), then the trader is said to be "legged up" because the trader has not achieved the desired strategy relationship according to the trading strategy definition.

Also, depending on the trading strategy, the price of a quoted leg may be based on less than all of the other legs, for example. As another example, the order parameters of an order in a quoted leg may lean on other types of market conditions in the other legs such as the last traded price (LTP), the last traded quantity (LTQ), a theoretical value, multiple quantities such as quantities closer to the inside market, or some other reference point.

In addition to having a single quoting leg, as discussed above, a trading strategy may be quoted in multiple (or even all) legs. In such situations, each quoted leg still leans on the other legs. When one of the quoted legs is filled, the orders in the other quoted legs are typically cancelled and then appropriate hedge orders are placed based on the leaned on prices that the filled leg was based on.

A trading strategy with more than two legs is known as a multi-legged strategy or a multi-legged spread. In a multi-legged strategy, multiple sets of hedge prices can be chosen from to maintain the defined relationship of the trading strategy for a particular quoted leg. When one leg is filled, the price for the leg that was filled, the desired price for the trading strategy, and the multipliers are known and there are N−1 unknowns, corresponding to the remaining N−1 unfilled legs. Thus, in a multi-legged strategy, there are two or more unknowns but still only a single equation (Equation 1). A single equation with more than one unknown has multiple solutions. Current systems utilize different techniques to determine the hedge prices for the remaining legs of a strategy once one leg has been filled.

III. Current Techniques to Determining Hedging Prices for Multi-Legged Strategies When buying and selling trading strategies, traders generally desire to achieve the target price for the trading strategy. That is, traders want to buy and/or sell (according to the definition of the trading strategy) the tradable objects for the legs of the trading strategy so as to result in a particular strategy price being realized. The strategy price may be determined according to Equation 1, discussed above, and is desired because traders using trading strategies may be concerned with achieving the price for the relationship rather than obtaining a particular price for the underlying tradable objects.

For example, if a trader believes that platinum is worth $100 more than gold, the trader would be willing to sell gold for $750 and buy platinum at $800. The trader would be just as willing to sell gold at $950 and buy platinum at $1000. In both cases, the trader is buying the platinum-gold spread at $50 when the trader believes it can later be sold for $100. A spread trader is interested in the difference in price between platinum and gold, and the price of each by itself is not meaningful in such a strategy.

As mentioned above, when one leg of a multi-legged strategy is filled, N−1 unknowns (corresponding to the remaining N−1 unfilled legs) remain to be determined. These unknowns correspond to the hedge prices for the unfilled legs.

Current systems utilize different techniques to determine the hedge prices for the remaining legs of a strategy once a leg has been filled. These techniques include "best fit," "lean prices," and "last legs." Note that other names may be used to refer to these techniques.

A. Best Fit

Best fit encompasses a category of techniques that use current market data and pre-determined logic to decide which combination of hedge prices is the "best." Many best fit techniques are "brute force."

For example, a best fit approach would be to use the inside market prices for N−2 legs and see which of the N−1 results gives the "best solution," fix that value for leg Z, and repeat until only one leg is left. The "best solution" may be the one in which the N−1 solution is closest to the market. Once one leg is left to be determined, the equation for strategy price (Equation 1) can then be used to solve for the hedge price of the remaining leg. Note that this type of brute force technique can be computationally expensive as the computation complexity is $O(n^2)$.

As another example, a best fit approach could utilize a more sophisticated algorithm, such as Levenberg-Marquardt, where the objective is to minimize the overall distance from the current markets. However, such algorithms are computationally complex.

To achieve the desired results with minimal legging, a best fit technique assumes the following conditions to be true: (1) quoting of a quoted leg was based on a valid market snapshot; (2) the multipliers of the legs are inversely correlated to the market price movement; and (3) a post-fill market snapshot that matches the market at the time the hedge orders arrive at the market. Subsequent techniques discussed below will also make reference to these assumptions. It should be noted that, as used herein, if these assumptions are not met, then the resulting calculations may be based on inaccurate data and will likely be inaccurate, increasing the likelihood of being legged or increasing the risk the trader is taking on with the trade. That is, failure to meet these assumptions will not prevent operation of the technique, but rather, that the result of the technique when one or more assumptions are not met is likely to be less desirable. Note that the third condition typically cannot be guaranteed because, even assuming the hedge order price could be instantly determined with the current market data when the quoted leg is filled, the market may move between the time a hedge order is generated and sent and its arrival at the market. This condition is also referred to herein as an accurate post-fill market snapshot.

B. Lean Prices

The lean prices technique involves keeping track of the lean prices used to determine the price of the order in the quoting leg. When the quoting leg is filled, hedge orders are then sent in the unfilled legs at these lean prices.

For example, assume a trading strategy is defined such that Leg A has a multiplier of "1" and Legs B and C have multipliers of "−2." Then assume that a trader desires to buy this strategy at a price of 0 and that the best bid prices for Legs B and C are at 25. Note that the best bid prices are used because when buying the strategy, these legs will be sold. The price that Leg A should be quoted to be bought at in order to achieve the desired strategy price may be determined by using Equation 1. The strategy price is known (0), all of the multipliers are known (1, −2, and −2) and the prices for two of the three legs are known (25 and 25). Thus, solving for the price of Leg A yields a price of 100. Consequently, according to the lean prices technique, when Leg A is filled, hedge orders will be submitted in Legs B and C to sell 2 units at a price of 25. This is true whether or not Leg A is actually filled at 100 or at a different price. Leg A may be filled at a lower price, for example, if the market in Leg A has dropped; an offer quoted at a price of 100 when the best ask price is only 90 will be filled at a price of 90, rather than 100. However, according to the lean prices technique, Legs B and C will still be quoted at a price of 25. Thus, if Legs B and C are filled at the quoted prices, the strategy price will not be achieved (1*90+−2*25+−2*25=−10).

Additionally, if the markets for the tradable objects for Legs B and C have gone down, the trading strategy will be legged, with neither hedge leg being filled because the quoted hedge prices (25) would then be higher than the current best bid price. On the other hand, if the markets for the tradable objects for Legs B and C have gone up, the hedge orders would get filled because the quoted hedge prices (25) would then be lower than the current best bid price, but no attempt is made to be sure that the hedge orders are filled at prices that achieve the desired strategy price, and thus it is likely that the desired price for the strategy will not be realized.

In the lean prices technique, in contrast to the best fit technique, only the first condition discussed above is assumed. That is, the lean prices technique only assumes that quoting of a quoted leg was based on a valid market snapshot.

However, as illustrated in the example above, this technique may produce an incorrect price for the trading strategy whenever the fill of the quoted leg occurs at a level other than the quoted price. It may be common for a quoted leg to be filled at a different price if one or more of the lean legs is in a volatile market or if large multipliers are used. In the case of a volatile market in a lean leg, the price of the order quoted in the quoting leg will likely change frequently in response to the changes in the lean leg's market, resulting in a fill at a level other than a quoted price. Similarly, if a large multiplier is utilized, this will amplify even small changes in a lean leg, also causing the price of the order quoted in the quoting leg to change frequently.

In addition, lean legs in a volatile market may end up with hedge orders being quoted well away from the market with little chance of being filled without a change in market direction, leaving the trader legged.

C. Last Legs

In the last legs technique, when a quoted leg is filled at a price other than the quoted price, adjustments are made to the hedge prices for "X" of these legs. Typically, X is 1 or 2 and these may be referred to as the "last" legs. The hedge prices for the other N−1−X legs are determined independently of any adjustment. That is, the hedge orders for these legs are submitted at the prices they would have been submitted if the fill in the quoting leg was at the quoting price. Typically, the hedging prices for these legs simply cross the market.

The hedge prices for the X legs are then adjusted based on the price the quoted leg was filled at and the prices of hedge prices for the N−1−X legs to achieve the desired strategy price. For example, if the X legs need to be adjusted by 12 ticks, the 12 ticks may be split evenly across the X legs by adjusting the hedge price for each leg by 12/X ticks. Alternatively, other techniques may be used to distribute the adjustment across the X legs.

The last legs technique has the same assumptions as the best fit technique, discussed above, but does not take full advantage of the assumption that multipliers be inversely correlated to the market price movement. As a result, when adjustment is needed, at least one of the legs will be over-adjusted and thus it is inherent in the last legs technique that in the case of a non-trivial adjustment, the trading strategy will be legged. This is because the total adjustment is distributed over only X legs, rather than all N−1 legs. By only adjusting X legs, these legs have to be over-adjusted to compensate for not making adjustments in the other N−1−X legs.

Thus, existing techniques for determining hedge prices in multi-legged strategies have numerous disadvantages when the fill price is different than the quoted price for the filled leg. For example, as discussed above, existing techniques may be computational expensive/complex, may not achieve the desired price for the trading strategy, and/or may leave the trader legged in one or more legs.

IV. The Multiplier-Adjusted Lean Levels Technique

Certain embodiments of the present invention provide a Multiplier-Adjusted Lean Levels (MALL) technique to determine hedge prices for the remaining legs of a trading strategy once a leg of the trading strategy has been filled. In the MALL technique, if a quoting order for the trading strategy is filled at the expected price (that is, at the quoted price), then hedge orders may be submitted based on the lean prices corresponding to the quoted price. That is, the unfilled legs are quoted using the lean levels on which the quoted price of the filled leg was based. Alternatively, the hedge order may be submitted based on some other technique such as historical information or weighted averages, for example. Therefore, in the case where the fill price is the same as the quoted price, this technique achieves the target price for the trading strategy.

However, if the fill occurs at a price other than the quoted price, then, under the described MALL technique, the hedge prices at which the unfilled legs are quoted to achieve the desired price for the trading strategy are calculated by adjusting the lean prices for the unfilled legs based at least in part on the difference between the quoted price and the filled price and the multipliers of the legs. Therefore, the desired price for the trading strategy may be realized, and is based on recent market conditions, but does not require (or assume that) the latest market snapshot to have been updated (e.g., due to latency in receiving updated price information). Note that the MALL technique may not be preferred when the fill occurs at a price other than the quoted price because the desired price for the trading strategy crosses the market.

Thus, the MALL technique discussed herein allows for the determination of hedging prices in a more computationally efficient manner, where the hedging prices achieve the desired price for the trading strategy and reduce the likelihood of leaving a trader legged.

For the purposes of the following discussion, an example trading strategy with "n" legs is utilized. The trading strategy may be similar to the trading strategy 310, discussed above, for example. The legs are Legs 1 to n. The legs may be similar to the legs 320, discussed above, for example. Each leg of the trading strategy is associated with a multiplier. The multiplier may be similar to the multiplier 326, discussed above, for example.

The function Mult(i) provides the multiplier associated with Leg i. The direction or side of the leg is given by the function PN(i), which provides the positive or negative sign for the multiplier of Leg i. In this example trading strategy definition, similar to those discussed above, the sign of the multiplier indicates whether the leg should be bought when the trading strategy is bought (positive) or sold when the trading strategy is bought (negative).

Leg f is the filled leg. Equation 2 is used to determine the difference (Diff) when the filled leg is filled at a different price than the quoted price:

$$\text{Diff} = \text{Expected Price}(f) - \text{Fill Price}(f) \qquad \text{Eq. 2}$$

For determining hedge prices for unfilled legs in the case where a quoted leg was filled at a price different than that quoted, two versions of the MALL technique are discussed below in more detail: Simple MALL and Advanced MALL.

A. Simple MALL

The Simple MALL technique considers the orders on the same side of the trading strategy and the opposite side of the trading strategy as single actions. That is, the buy orders for the individual legs are considered as a single action and the sell orders for the individual legs are considered as another single action. The legs on each side of the trading strategy have the same adjustment to their respective lean prices applied. These price shifts are independent of the individual leg multiplier.

The Simple MALL technique assumes only the first condition discussed above with respect to the best fit technique to be true. That is, Simple MALL assumes that the quoting of a quote leg was based on a valid market snapshot. Recall, as noted above, that, as used herein, if these assumptions are not met, then the resulting calculations may be based on inaccurate data and will likely be inaccurate, increasing the likelihood of being legged or increasing the risk the trader is taking on with the trade. That is, failure to meet these assumptions will not prevent operation of the technique, but rather, that the result of the technique when one or more assumptions are not met is likely to be less desirable.

Under the Simple MALL technique, a same side total (SST) and an other side total (OST) are determined using Equations 3 and 4, respectively:

$$\text{SST} = \Sigma_{i=1}^{n} (\text{if } (\text{PN}(i) = \text{PN}(f))) \rightarrow \text{Mult}(i) \qquad \text{Eq. 3}$$

$$\text{OST} = \Sigma_{i=1}^{n} (\text{if } (\text{PN}(i) \neq \text{PN}(f))) \rightarrow \text{Mult}(i) \qquad \text{Eq. 4}$$

The SST is the sum of the multipliers of the legs on the same side as the filled Leg f. The OST is the sum of the multipliers of the legs on the opposite side as the filled Leg f. Recall that the multipliers associated with the Legs 1 to n are signed values. Those multipliers with the same sign as the filled leg are said to be on the same side and those multipliers with the opposite sign as the filled leg are said to be on the opposite side.

A side ratio (SR) is then determined using Equation 5:

$$SR = \frac{SST}{OST} \qquad \text{Eq. 5}$$

The side ratio reflects the weight or importance of each side of the trading strategy. Then, using Equation 6, hedging prices for each of the unfilled legs may be determined:

$$\forall i \in [1, n] : \text{hedge price}(i) = \qquad \text{Eq. 6}$$
$$\begin{cases} \text{if } ((i \neq f) \& (PN(i) = PN(f))) \rightarrow \text{Lean Price}(i) + (-\text{Diff}) \\ \text{if } (PN(i) \neq PN(f)) \rightarrow \text{Lean Price}(i) + (SR * \text{Diff}) \end{cases}$$

Thus, the hedge price for a leg on the same side of the trading strategy as the filled leg will be the lean price for the leg plus the opposite of the difference (as computed above). For a leg on the opposite side as the filled leg, the hedge price is the lean price for the leg plus the side ratio multiplied by the difference.

B. Advanced MALL

The Advanced MALL technique determines an adjustment to each leg's lean price based on expected market movement, accounting for individual leg multipliers. The individual leg multipliers are used to determine the adjustment based on the assumption that leg multipliers are correlated to expected market movement.

The Advanced MALL technique assumes both the first and second conditions discussed above with respect to the best fit technique to be true. That is, Advanced MALL assumes that the quoting of the quoted leg be based on a valid market snapshot and that the multipliers of the legs be inversely correlated to the market price movement. However, Advanced MALL has the added benefit that each leg hedge price is adjusted according to expected market movement and is therefore less likely to be legged while maintaining the desired price for the trading strategy. Recall, as noted above, that, as used herein, if these assumptions are not met, then the resulting calculations may be based on inaccurate data and will likely be inaccurate, increasing the likelihood of being legged or increasing the risk the trader is taking on with the trade. That is, failure to meet these assumptions will not prevent operation of the technique, but rather, that the result of the technique when one or more assumptions are not met is likely to be less desirable.

In the Advanced MALL technique, a same side count (SSC) and other side count (OSC) are determined using Equations 7 and 8, respectively:

$$SSC = \Sigma_{i=1}^{n}(\text{if}(PN(i)=PN(f))) \to 1 \qquad \text{Eq. 7}$$

$$OSC = \Sigma_{i=1}^{n}(\text{if}(PN(i) \neq PN(f))) \to 1 \qquad \text{Eq. 8}$$

The SSC is effectively a count of the number of legs on the same side as the filled Leg f. The OSC is effectively a count of the number of legs on the opposite side as the filled Leg f.

An other side delta (OSD) is then determined using Equation 9:

$$OSD = Mult(f) * \frac{SCC * Diff}{OSC} \qquad \text{Eq. 9}$$

The other side delta represents a gross adjustment needed on the other side of the fill and is basically the ratio of the number of legs on each side times the fill leg multiplier times the difference in price on the fill leg.

Hedge prices for the unfilled legs may then be determined using Equation 10:

$$\forall i \in [1, n] : \text{hedge price}(i) = \begin{cases} \text{if } ((i \neq f) \& (PN(i) = PN(f))) \to \text{Lean Price}(i) + \frac{Mult(f) * (-Diff)}{Mult(i)} \\ \text{if } (PN(i) \neq PN(f)) \to \text{Lean Price}(i) + \frac{OSD}{Mult(i)} \end{cases} \qquad \text{Eq. 10}$$

Thus, the hedge price for a particular leg on the same side of the trading strategy as the filled leg will be the lean price for the particular leg plus the multiplier of the filled leg multiplied by the opposite of the difference and divided by the multiplier of the particular leg. For a particular leg on the opposite side as the filled leg, the hedge price is the lean price for the particular leg plus the OSD (as computed above) divided by the multiplier of the particular leg. This results in an adjustment of each leg based on its relative weight within its side of the trading strategy.

C. One-Sided Strategies

As special case trading strategy is a one-sided strategy. In a one-sided strategy, the filled leg is typically preferred to be negatively correlated to the other legs. In a one-sided strategy (a trading strategy which has only all positive or all negative multipliers for all the legs), the Simple MALL technique can be simplified to compute a delta ($\Delta$) using Equation 11:

$$\Delta = Mult(f) * \frac{Diff}{\sum_{i=1}^{n} (\text{if } (i \neq f)) \to Mult(i)} \qquad \text{Eq. 11}$$

That is, $\Delta$ is the multiplier of the filled leg times the difference (as computed above) divided by the sum of the multipliers of the other legs. This is used to divide the adjustment equally across all of the legs on the single side of the trading strategy.

Then, hedge prices for the unfilled legs of the one-sided strategy using Simple MALL may be determined using Equation 12:

$$\forall i \in [1,n]: \text{hedge price}(i) = \text{if } (i \neq f) \to \text{Lean Price}(i) + \Delta \qquad \text{Eq. 12}$$

The Advanced MALL technique, for a one-sided strategy, can be simplified to compute a delta ($\Delta$) using Equation 13:

$$\Delta = Mult(f) * \frac{Diff}{\sum_{i=1}^{n} (\text{if } (i \neq f)) \to 1} \qquad \text{Eq. 13}$$

That is, $\Delta$ is the multiplier of the filled leg times the difference (as computed above) divided by the count of the un-filled legs. This is used to divide the adjustment across all of the legs on the single side of the trading strategy, taking into account the individual leg multiplier (as computed below).

Then, hedge prices for the unfilled legs of the one-sided strategy using Advanced MALL may be determined using Equation 14:

$$\forall i \in [1, n] : \text{hedge price}(i) = \text{if } (i \neq f) \to \text{Lean Price}(i) + \frac{\Delta}{Mult(i)} \qquad 14$$

D. Advantages

The MALL technique has numerous advantages over existing approaches. For example, with respect to best fit techniques, the MALL technique is computationally more efficient. The MALL technique requires O(n) calculations (where n corresponds to the number of legs in the trading strategy) to determine the hedge prices for the unfilled legs. In contrast, best fit techniques are more computationally complex. For example, one example best fit algorithm described above requires $O(n^2)$ calculations and other algorithms may require more. The MALL technique is also a simpler algorithm in that it is not recursive, whereas some best fit algorithms are. Further, the MALL technique does not require any assumptions regarding how to achieve a "best fit" and the corresponding complex best fit logic may be eliminated.

Additionally, the MALL technique does not require current market data to determine the hedge prices, which is an advantage when markets are volatile. That is, the MALL technique will behave correctly even in fast-changing markets, where the latest market snapshot is not available to quote the hedge legs after a quoted leg has been filled. Best fit techniques, in contrast, require an accurate post-fill market snapshot in order to determine hedge prices.

The MALL technique also achieves a better market fit than the best fit technique because the initial lean prices were based on actual, not theoretical, market conditions. In contrast, the best fit technique is based on assumptions of how to best fit future market conditions.

With respect to the lean prices technique, the MALL technique will result in a desired price for the trading strategy being achieved. In contrast, the lean prices technique will not result in a desired price for the trading strategy being achieved when the quoted leg is filled at a price other than the quoted price. This is because the lean prices technique does not account for the quoted leg filling at a different price when placing the hedging orders. Instead, the hedging orders are priced based on the lean levels that the filled leg was quoted at.

With respect to the last legs technique, the MALL technique does not suffer from the legging issue of the last legs technique. While legging may still occur with the MALL technique, it is not an inherent part of the solution as in the case of the last legs technique. That is, while the MALL technique may result in one or more legs of the trading strategy being legged, this is not by design and rather happens when hedge markets move in an uncorrelated or out-of-proportion manner. In contrast, the last legs technique will almost always over-adjust the price to quote one or more of the last legs, resulting in the trader being legged.

Another advantage of the MALL technique is with respect to rounding. Due to the ticking and multipliers for the legs, occasionally a trading strategy may be quoted at a level which is slightly better than the price requested by the user. For example, consider a spread with two legs, A and B. Leg A has a multiplier of 2 and Leg B has a multiplier of −3. Both legs tick in increments of 1. If an order is placed to buy the spread at 0 and the lean price of Leg B is 9, then Leg A should be quoted at a bid price of (0+(−3*9))/2=14.5. However, 14.5 is not a valid price for Leg A, so a bid order will be placed at 14, which results in trying to buy the spread at a price of (2*14)+(−3*9)=−1, which is a "better" price.

After applying the MALL technique, it is possible that another set of rounding will need to be done. Continuing the example above, if Leg A is filled at 14, the hedge price for Leg B would be (0+(2*14))/3=8.667. However, this is not a valid price for Leg B so the hedge order will be rounded to sell at 9. At this point, a variant version of MALL may round some of the legs to a level such that the strategy price would be worse than the quoted price, but still as good as or better than the requested price. This provides two benefits. First, hedge orders are closer to the price requested by the user. Second, hedge orders are less likely to be legged.

Yet another advantage of the Advanced MALL technique is when pay-up ticks are used. In volatile markets, it may be reasonable to expect each of the legs to have a pay-up tick associated with it because, generally, the lean prices may not be available in the market when the quoted order is filled. Pay-up ticks may be used by traders who would rather not get their desired strategy price than get legged. Because the Advanced MALL technique gets closer to the current market, with pay-up ticks, the trading strategy is less likely to be legged than with other techniques.

V. Examples of the Performance of Various Techniques

Figure 4:
FIG. 4 illustrates a table showing example results for different hedging techniques.

FIG. 4 illustrates a table 400 showing example results for different hedging techniques. More particularly, the first two columns of the table 400 provide the definition of a trading strategy with six legs, with the first column identifying the legs of the trading strategy (Legs 1-6) and the second column showing the multipliers associated with each leg. For the purposes of illustration, Leg 1 is shown as the filled leg, however, it should be understood that any of the six legs may be the filled leg for applying the MALL technique as discussed herein.

In the example illustrated in table 400, a trader desires to buy the trading strategy at a price of 0. The "Lean Price" column shows, for Leg 1, the price the filled leg was quoted at, and for the remaining legs, the corresponding lean prices used to quote Leg 1 to achieve the desired strategy price. In this case, Leg 1 was quoted at a price of 100 and Legs 2-6 each had a lean price of 100.

The "Market" column shows the market price for the underlying tradable objects at the time the filled leg (Leg 1) was filled. Notice that while Leg 1 was quoted at a price of 100, it was actually filled at 90. That is, the filled leg was bought 10 ticks better than the quoted price. As discussed above, this situation may arise in a volatile market, for example. In this example, all of the markets have moved down. Note that this may be expected because markets used in a trading strategy are typically preferred to be correlated. Had the market in the filled leg gone up, either it would have been filled at the desired price of 100 or it would not have been filled at all. With respect to the other legs, if they had stayed flat or moved up then the hedge orders could be filled at the corresponding lean prices (or better). Thus, the situation of interest in this example occurs when the filled leg is filled at a better price but the hedge legs would be legged if quoted at their lean prices. It should also be noted that typically, when a market makes a large jump in one direction, a small bounce in the other direction is not uncommon.

The remaining columns of the table 400 provide the hedging prices to be quoted for the remaining unfilled legs of trading strategy as determined by the various techniques discussed above.

The best fit technique results in only one leg being legged. Specifically, Leg 4, which is quoted to sell at 92, is legged because the market is at 90. Thus, the legged order is two ticks from the market. Consequently, if the market stays flat or experiences only a small, 1-tick bounce before continuing to going down, the trader will still be legged.

The lean prices technique quotes Legs 2-6 at the lean prices used for quoting Leg 1 at 100. Thus, this technique does not take into account the fact that Leg 1 was actually filled at a lower price. As a result, the trader is legged in all five legs and each quote is far from the market. Further, even if the quotes for the hedge legs were to fill, the desired price for the trading strategy would not be achieved because Leg 1 actually filled at a different price than expected. The resulting price for the trading strategy would be −90 rather than 0. While in this case that is a better price than the one sought by the trader, it is undesirable because an extra risk of getting legged (and, therefore, of losing money) has been taken. This is an extra risk because the trading tool using the lean prices technique has introduced it against the expectation of the trader and has effectively sent hedge orders for the wrong (unrequested) spread price.

The last legs technique tries to ensure that the trader is legged on no more than X legs. However, in this example where X=1, the leg that is legged (Leg 6) is 4 ticks from the market. In addition, the other legs have no margin for error if they are slow in getting to the market or if the market snapshot is stale. That is, these legs may also be legged if the market changes by even one tick or if they are based on out-of-date market information.

The Simple MALL technique is similar to the last legs technique in that only one leg (Leg 6) is legged, although this leg is even further from the market (8 ticks). However, the trader has some margin for error under this technique because two of the legs (Legs 2 and 3) will each be filled 1 tick better.

The Advanced MALL technique performs well at fitting the market's movement. Two legs (Legs 4 and 5) are legged, but both are only 1 tick away from the market and will be filled if the market has even a minor bounce.

The table 400 also indicates the "Total Ticks Missed" and "Maximum Ticks Missed." Total ticks missed is indicative of how far overall the technique was from not being legged. Alternatively, it may be viewed as how much the trade is currently costing. Maximum ticks missed is indicative of how long the technique is likely to remain legged. That is, how far the furthest leg is from the market.

As illustrated in table 400, the total number of ticks missed for Simple MALL is 6, accounting for the two legs which are quoted 1 tick better than the market. For Advanced MALL, the total number of ticks missed is 2 (as good as best fit) with the maximum number of ticks missed being 1 (better than best fit). Thus, in both cases, Simple MALL and Advanced MALL provide better results than lean prices with less computational complexity than best fit. In addition, the MALL technique does not require an accurate post-fill market snapshot, unlike best fit and last legs. This advantage becomes more clear in the next example.

FIG. 5 illustrates a table 500 showing example results for different hedging techniques. More particularly, the table 500 illustrates an example similar to the table 400, discussed above, in which, at the time Leg 1 was filled, the latest market snapshot available to the trading tool is stale or out of date for Legs 2-5.

As in table 400, the first two columns of table 500 provide the definition of the trading strategy. The "Lean Price" and "Market" columns are also similar. However, while the "Market" column represents the actual market prices at the exchange at the time Leg 1 is filled, the "Market Snapshot" column represents a view of what the trader's trading tool thinks the market is when the fill for the quoted leg has been received and hedge prices are being calculated. In this case, the market snapshot is stale or out of date and shows older prices for Legs 2-6 rather than the actual market prices at the exchange when Leg 1 is filled. The market snapshot may be inaccurate because of a slow price feed, a rapid fill delivery, and/or price coalescing, for example. The market snapshot being out of date may be common in a volatile or fast moving market, for example. Similarly to table 400, for the purposes of illustration, Leg 1 is shown as the filled leg, but it should be understood that any of the six legs may be the filled leg.

As is illustrated in table 500, both the best fit and last legs techniques result in hedge orders that are legged in 4 of the 5 hedge legs. This is in contrast to the example illustrated in table 400, which assumed that the trading tool had access to the most current market prices at the time Leg 1 was filled, where these techniques each had only one leg of the strategy legged. This is because, as discussed above, both of these techniques require an accurate (that is, up-to-date) post-fill market snapshot.

The lean prices technique, while not affected by the stale market snapshot, is still legged in all 5 legs and is quoting well away from the market, just as in the example discussed above with respect to FIG. 4.

In contrast, both Simple MALL and Advanced MALL are not impacted by the stale market snapshot because MALL, as discussed above, does not depend on having an accurate post-fill market snapshot. Rather, the MALL technique determine hedge prices by adjusting the lean prices for the unfilled legs based at least in part on the difference between the quoted price and the filled price in the filled leg and the multipliers of the legs.

VI. Example Embodiments

Figure 6:
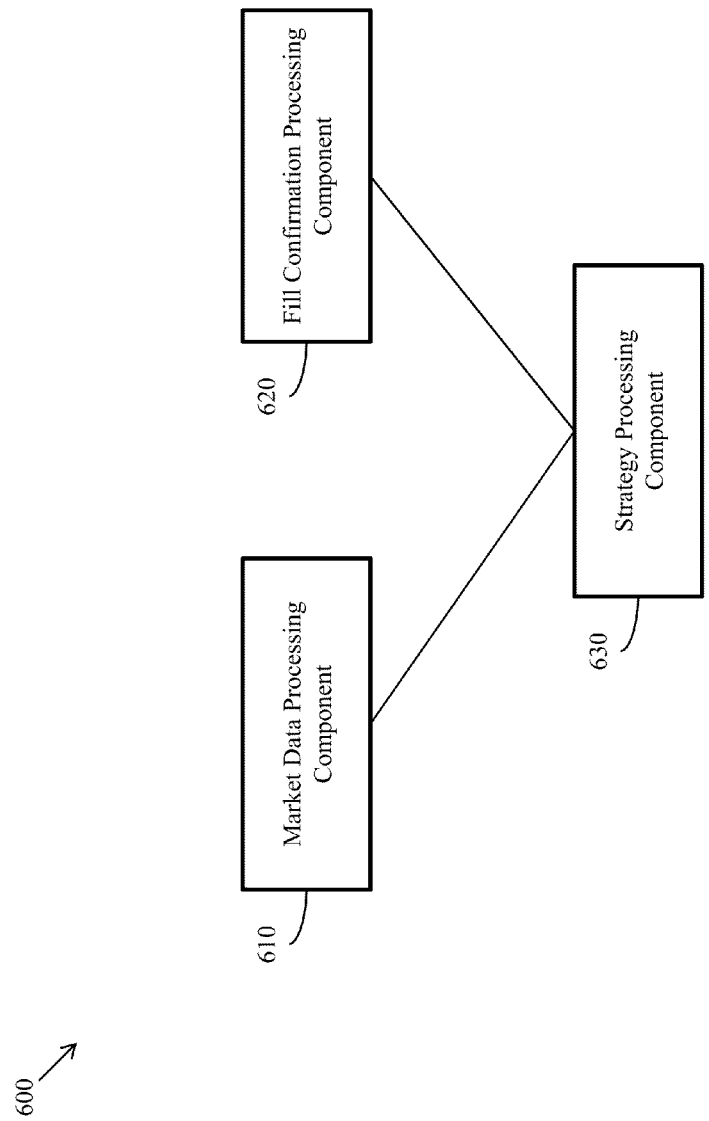
FIG. 6 illustrates a system for trading in an electronic trading environment using a MALL technique according to an embodiment of the present invention.

FIG. 6 illustrates a system 600 for trading in an electronic trading environment using a MALL technique according to an embodiment of the present invention. The system 600 includes a market data processing component 610, a fill confirmation processing component 620, and a strategy processing component 630.

The strategy processing component 630 is in communication with the market data processing component 610 and the fill confirmation processing component 620.

In operation, market data for tradable objects being traded as legs of a trading strategy is received by the market data processing component 610 from an electronic exchange. The fill confirmation processing component 620 receives a fill confirmation from the electronic exchange for an order at a quoted price for one of the tradable objects in the trading strategy. The fill confirmation provides a filled price at which the tradable object was filled. The strategy processing component 630 determines hedge prices for the tradable objects for the unfilled legs of the trading strategy. The strategy processing component 630 determines a difference between the filled price and the quoted price for the tradable object of the filled leg. When the filled price and the quoted price are different, the hedge prices for the unfilled legs are based at least in part on the difference and at least one multiplier associated with at least one leg of the trading strategy. The strategy processing component 630 then sends hedge orders for the tradable objects for the unfilled legs in the trading strategy to the electronic exchange using the determined hedge prices.

In certain embodiments, the market data processing component 610 is part of a client device similar to the client device 110 and/or 210, discussed above. In certain embodiments, the market data processing component 610 is part of a gateway similar to the gateway 120 and/or 220, discussed above. In certain embodiments, the market data processing component 610 is part of an exchange similar to the exchange 130 and/or 230, discussed above. In certain embodiments, the fill confirmation processing component 620 is part of a client device similar to the client device 110 and/or 210, discussed above. In certain embodiments, the fill confirmation processing component 620 is part of a gateway similar to the gateway 120 and/or 220, discussed above. In certain embodiments, the market fill confirmation processing component 620 is part of an exchange similar to the exchange 130 and/or 230, discussed above. In certain embodiments, the strategy processing component 630 is part of a client device similar to the client device 110 and/or 210, discussed above. In certain embodiments, the strategy processing component 630 is part of a gateway similar to the gateway 120 and/or 220, discussed above. In certain embodiments, the market strategy processing component 630 is part of an exchange similar to the exchange 130 and/or 230, discussed above.

The market data processing component 610 is adapted to receive market data from an electronic exchange relating to tradable objects traded as legs of a trading strategy. The electronic exchange may be similar to the exchange 130 and/or 230, discussed above, for example. The trading strategy may be similar to the trading strategy 310, discussed above, for example.

In certain embodiments, the market data processing component 610 receives market data for three or more tradable objects traded as legs of a trading strategy. For example, the trading strategy may be a multi-legged strategy, as discussed above.

In certain embodiments, the trading strategy is a spread. For example, the trading strategy may be a multi-legged spread.

In certain embodiments, the trading strategy includes a multiplier associated with each leg. For example, a trading strategy may be defined such that buying the trading strategy involves buying 2 units of a first tradable object for leg A and selling 3 units of a second tradable object for leg B. In this example, the multipliers associated with each leg may be the same as the spread ratio for each leg. Thus, the multiplier associated with leg A may be "2" and the multiplier associated with leg B may be "−3." Note that in this example, a multiplier associated with a leg is positive when the leg is in the same direction as the trading strategy (e.g., buying the trading strategy involves buying the leg) and the multiplier associated with a leg is negative when the leg is in the opposite direction as the trading strategy (e.g., buying the trading strategy involves selling the leg).

The fill confirmation processing component 620 is adapted to receive a fill confirmation for a tradable object from the electronic exchange. The fill confirmation may be for an order for one of the tradable objects traded as part of the trading strategy, for example. The fill confirmation includes a filled price for the tradable object that has been filled. The filled price is the price at which the order for the tradable object was filled at the electronic exchange.

In certain embodiments, the fill confirmation processing component 620 is in communication with the market data processing component 610. In one or more of these embodiments, the fill confirmation processing component 620 may receive the fill confirmation for a tradable object from the electronic exchange through the market data processing component 610.

The strategy processing component 630 is adapted to determine a difference between the quoted price for the tradable object and the filled price for the tradable object. This difference may be determined using an equation similar to Equation 2, discussed above, for example.

The strategy processing component 630 is adapted to determine a hedge price for the other legs of the trading strategy. In certain embodiments, the hedge price is determined based at least in part on the difference and at least one multiplier associated with at least one leg of the trading strategy. For example, if the quoted price is different from the filled price (e.g., the difference is non-zero), then the hedge price may be determined based on the difference and the at least one multiplier. In certain embodiments, the hedge price is the lean price that was used when quoting the filled leg. For example, when the quoted price is the same as the filled price (e.g., the difference is zero), then a stored lean level for the leg may be used as the hedge price.

In certain embodiments, the hedge price may be determined based at least in part on adjusting a lean price for the tradable object based on the difference and at least one multiplier associated with at least one leg of the trading strategy. For example, the filled leg of the trading strategy may have been quoted at a particular price based on particular lean prices for the other legs of the trading strategy. When the filled leg is filled at a price different from the quoted price for that leg, the hedge prices for the other legs of the trading strategy may be determined at least in part by adjusting the lean price based on the difference and one or more multipliers for the trading strategy.

In certain embodiments, the strategy processing component 630 utilizes the MALL technique, discussed above, to determine one or more of the hedge prices.

In certain embodiments, the strategy processing component 630 utilizes the Simple MALL technique, discussed above, to determine one or more of the hedge prices. In certain embodiments, a side ratio is determined by the strategy processing component 630. The side ratio may be a same side total divided by an other side total, where the same side total is the sum of the multipliers associated with the legs that are in the same direction as the filled leg and the other side total is the sum of the multipliers associated with the legs that are in the opposite direction as the filled leg. The side ratio may be determined using an equation similar to Equation 5, discussed above, for example. In certain embodiments, the hedge price for a tradable object is determined based at least in part on adding the lean price of the tradable object to the opposite of the difference when the tradable object is for a leg in the same direction as the filled leg. In certain embodiments, the hedge price for a tradable object is determined based at least in part on adding the lean price of the tradable object to the side ratio multiplied by the difference when the tradable object is for a leg in the opposite direction as the filled leg. In certain embodiments, the hedge price may be determined using an equation similar to Equation 6, discussed above.

In certain embodiments, the strategy processing component 630 utilizes the Advanced MALL technique, discussed above, to determine one or more of the hedge prices. In certain embodiments, a same side count, an other side count, and an other side delta may be determined by the strategy processing component 630. The same side count may be the number of legs that are in the same direction as the filled leg. The other side count may be the number of legs that are in the opposite direction as the filled leg. The other side delta may be equal to the multiplier of the filled leg multiplied by the same die count multiplied by the difference divided by the other side count. The other side delta may be determined using an equation similar to Equation 9, discussed above, for example. In certain embodiments, the hedge price for a tradable object is determined based at least in part on adding the lean price of the tradable object to the multiplier associated with the first leg multiplied by the opposite of the difference divided by the multiplier associated with the leg for the tradable object. In certain embodiments, the hedge price for a tradable object is determined based at least in part on adding the lean price of the tradable object to the other side delta divided by the multiplier associated with the leg for the tradable object. In certain embodiments, the hedge price may be determined using an equation similar to Equation 10, discussed above.

In certain embodiments, the strategy processing component 630 utilizes the Simple MALL technique, as discussed above, to determine one or more of the hedge prices for a one-sided strategy. For example, the strategy processing component 630 may determine a delta equal to the multiplier associated with the filled leg multiplied by the difference divided by the sum of the multipliers associated with the legs other than the filled leg. In certain embodiments, the delta may be determined using an equation similar to Equation 11, discussed above. The hedge price for a tradable object may then be determined based at least in part on adding a lean price for the tradable object to the delta when all of the legs for the trading strategy are on the same side. In certain embodiments, the hedge price may be determined using an equation similar to Equation 12, discussed above.

In certain embodiments, the strategy processing component 630 utilizes the Advanced MALL technique, as discussed above, to determine one or more of the hedge prices for a one-sided strategy. For example, the strategy processing component 630 may determine a delta equal to the multiplier associated with the filled leg multiplied by the number of other legs in the trading strategy. In certain embodiments, the delta may be determined using an equation similar to Equation 13, discussed above. The hedge price for a tradable object may then be determined based at least in part on adding a lean price for the tradable object to the delta divided by the multiplier associated with the leg for the tradable object when all of the legs for the trading strategy are on the same side. In certain embodiments, the hedge price may be determined using an equation similar to Equation 14, discussed above.

The components, elements, and/or functionality of the system 600 discussed above may be implemented alone or in combination in various forms in hardware, firmware, and/or as a set of instructions in software, for example. Certain embodiments may be provided as a set of instructions residing on a computer-readable medium, such as a memory, hard disk, CD-ROM, DVD, and/or EPROM, for execution on a general purpose computer or other processing device.

Figure 7:
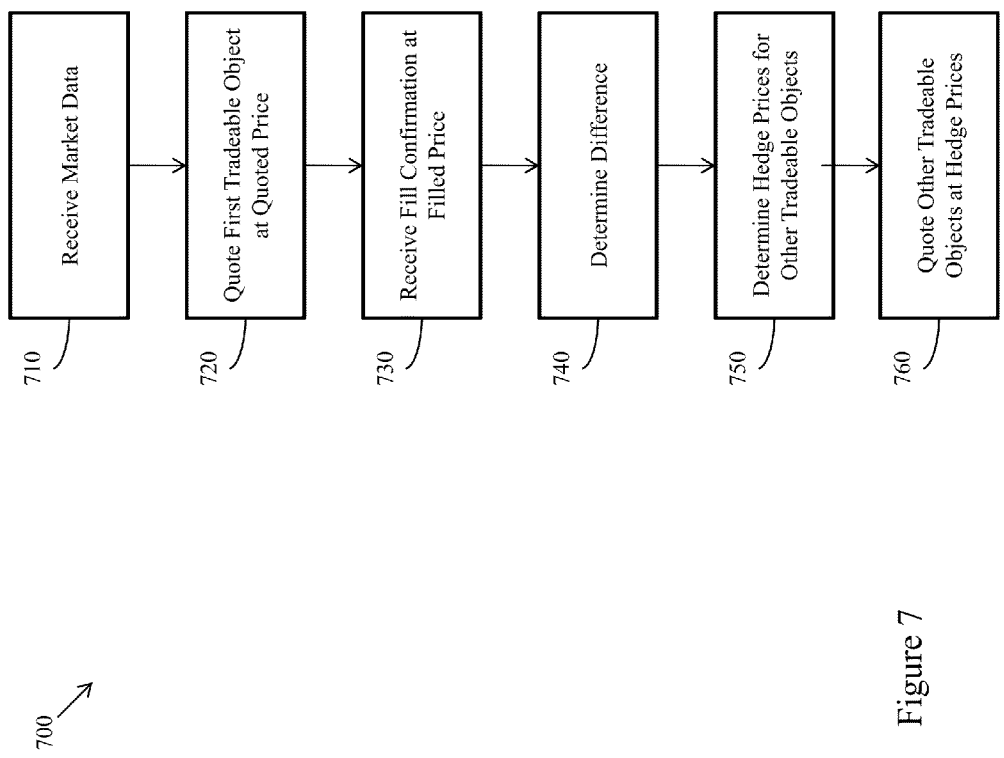
FIG. 7 illustrates a flowchart of a method for trading in an electronic trading environment using a MALL technique according to an embodiment of the present invention.

FIG. 7 illustrates a flowchart 700 of a method for trading in an electronic trading environment using a MALL technique according to an embodiment of the present invention. The method includes the following steps which will be described below in more detail. At step 710, market data is received. At step 720, a first tradable object is quoted at a quoted price. At step 730, a fill confirmation at a filled price is received. At step 740, a difference is determined. At step 750, hedge prices for other tradable objects are determined. At step 760, the other tradable objects are quoted at the hedge prices. The method is described with reference to elements of systems discussed above, but it should be understood that other implementations are possible.

At step 710, market data is received. The market data may be received by a market data processing component similar to the market data processing component 610, discussed above, for example. The market data may be received from an electronic exchange, for example. The electronic exchange may be similar to the exchange 130 and/or 230, discussed above, for example.

The market data may include market data relating to one or more tradable objects that are part of a trading strategy. For example, the market data may include price and trade information for tradable objects that are being traded by a trader as part of a spread.

The trading strategy may be similar to the trading strategy 310, discussed above, for example. The trading strategy may include two or more legs for two or more tradable objects, for example. The legs may be similar to the legs 320, discussed above, for example. In certain embodiments, multipliers are associated with one or more of the legs of the trading strategy. The multipliers may be similar to the multipliers 326, discussed above, for example.

At step 720, a first tradable object is quoted at a quoted price. The first tradable object may be part of a trading strategy. Note that the first tradable object is not necessarily the first leg of the trading strategy. Rather, the term "first tradable object" is used here without loss of generality to identify a particular tradable object that is for a leg of the trading strategy. The first tradable object is quoted based on an order to buy or sell the trading strategy from a trader, for example. For example, a quoting order at a quoted price may be sent for the first tradable object by a strategy processing component similar to the strategy processing component 630, discussed above.

The first tradable object may be quoted at an electronic exchange, for example. For example, the electronic exchange may be the same electronic exchange that the market data received at step 710, discussed above, is received from.

The quoted price for the first tradable object may be determined by a strategy processing component. The strategy processing component may determine the quoted price for the first tradable object based on an order to buy or sell a trading strategy including the first tradable object made by a trader, for example. For example, the quoted price may be determined based on market prices for one or more of the other legs of the trading strategy.

At step 730, a fill confirmation at a filled price is received. The fill confirmation may be received by a fill confirmation processing component similar to the fill confirmation processing component 620, discussed above, for example. The fill confirmation may be received by a market data processing component similar to the market data processing component 610, discussed above, for example. The market data processing component may then provide the fill confirmation to a fill confirmation processing component.

The fill confirmation is received after the quote for the first tradable object, discussed above in step 720, is filled. The filled price indicates the price at which the quoting order for the first tradable object was filled. The filled price may be different than the quoted price.

The fill confirmation may be received from an electronic exchange, for example. For example, the electronic exchange may be the same electronic exchange that the market data received at step 710, discussed above, is received from.

At step 740, a difference is determined. The difference is determined between the quoted price for the first tradable object (quoted at step 720, discussed above) and the filled price for the first tradable object (received at step 730, discussed above). This difference may be determined using an equation similar to Equation 2, discussed above, for example. As another example, the filled price may simply be compared to the quoted price to determine if they are different. The difference may be determined by a strategy processing component similar to the strategy processing component 630, discussed above, for example.

At step 750, hedge prices for other tradable objects are determined. The other tradable objects are the tradable objects for the unfilled legs of the same trading strategy as the first tradable object quoted at step 720, discussed above. The hedge prices for one or more of the other tradable objects may be determined by a strategy processing component similar to the strategy processing component 630, discussed above, for example.

The hedge prices may be determined based at least in part on the difference determined at step 740, discussed above, for example. For example, the hedge price of a tradable object may be determined based at least in part on adjusting a lean price for the tradable object based on the difference and at least one multiplier associated with at least one leg of the trading strategy. In certain embodiments, one or more of the hedge prices are determined using the MALL technique, discussed above. In certain embodiments, one or more of the hedge prices are determined using the Simple MALL technique, discussed above. In certain embodiments, one or more of the hedge prices are determined using the Advanced MALL technique, discussed above.

At step 760, the other tradable objects are quoted at the hedge prices. The hedge prices are the hedge prices determined at step 750, discussed above. The other tradable objects may be quoted by sending hedge orders at the corresponding hedge prices to an electronic exchange by a strategy processing component similar to the strategy processing component 630, discussed above. The electronic exchange may the same electronic exchange that the first tradable object was quoted at in step 720, for example. Alternatively, one or more of the other tradable objects may be quoted at a different electronic exchange than the one that the first tradable object was quoted at.

One or more of the steps of the method discussed above may be implemented alone or in combination in various forms in hardware, firmware, and/or as a set of instructions in software, for example. Certain embodiments may be provided as a set of instructions residing on a computer-readable medium, such as a memory, hard disk, CD-ROM, DVD, and/or EPROM, for execution on a general purpose computer or other processing device.

Certain embodiments of the present invention may omit one or more of these steps and/or perform the steps in a different order than the order listed. For example, some steps may not be performed in certain embodiments of the present invention. As a further example, certain steps may be performed in a different temporal order, including simultaneously, than listed above.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A method including:
   receiving by a computing device market data relating to a plurality of tradable objects, wherein the plurality of tradable objects includes at least a first tradable object, a second tradable object, and a third tradable object, wherein the tradable objects are traded as legs of a trading strategy, wherein the trading strategy includes a multiplier associated with each leg;
   sending by the computing device a quoting order to an electronic exchange for the first tradable object at a quoted price, wherein the quoted price is based at least in part on a lean price for each of the plurality of tradable objects other than the first tradable object;
   receiving by the computing device a fill confirmation for the quoting order for the first tradable object at a filled price, wherein the filled price is different from the quoted price, wherein the filled price is better than the quoted price;
   determining by the computing device a difference value between the quoted price and the filled price;
   determining by the computing device a hedge price for each of the plurality of tradable objects other than the first tradable object based at least in part on the lean price for the tradable object added to one of:
      (1) the opposite of the difference value, when the tradable object is for a leg in the same direction as the leg for the first tradable object, and
      (2) a side ratio multiplied by the difference value, when the tradable object is for a leg in the opposite direction as the leg for the first tradable object, wherein the side ratio is a same side total divided by an other side total, wherein the same side total is the sum of the multipliers associated with the legs that are in the same direction as the leg for the first tradable object, and wherein the other side total is the sum of the multipliers associated with the legs that are in the opposite direction as the leg for the first tradable object; and
   sending by the computing device hedge orders for each of the plurality of tradable objects other than the first tradable object at the corresponding hedge price.

2. The method of claim 1, wherein the trading strategy is a spread.

3. The method of claim 1, wherein the first tradable object, the second tradable object, and the third tradable object are the only legs of the trading strategy.

4. The method of claim 1, wherein the lean price for a tradable object in the plurality of tradable objects other than the first tradable object is the best bid price for the tradable object when the quoting order is an order to buy the first tradable object and the best ask price for the tradable object when the quoting order is an order to sell the first tradable object.

5. The method of claim 1, wherein the lean price for a tradable object in the plurality of tradable objects other than the first tradable object is the best ask price for the tradable object when the quoting order is an order to buy the first tradable object and the best bid price for the tradable object when the quoting order is an order to sell the first tradable object.

6. The method of claim 1, wherein the difference value is determined by subtracting the filled price from the quoted price.

7. A method including:
   receiving by a computing device market data relating to a plurality of tradable objects, wherein the plurality of tradable objects includes at least a first tradable object, a second tradable object, and a third tradable object, wherein the tradable objects are traded as legs of a trading strategy, wherein the trading strategy includes a multiplier associated with each leg;
   sending by the computing device a quoting order to an electronic exchange for the first tradable object at a quoted price, wherein the quoted price is based at least in part on a lean price for each of the plurality of tradable objects other than the first tradable object;
   receiving by the computing device a fill confirmation for the quoting order for the first tradable object at a filled price, wherein the filled price is different from the quoted price, wherein the filled price is better than the quoted price;
   determining by the computing device a difference value between the quoted price and the filled price;
   determining by the computing device a hedge price for each of the plurality of tradable objects other than the first tradable object based at least in part on a lean price for the tradable object added to a delta, when all of the legs for the plurality of tradable objects are on the same side, wherein the delta is equal to the multiplier associated with the leg for the first tradable object multiplied by the difference value divided by the sum of the multipliers associated with the legs other than the leg for the first tradable object; and
   sending by the computing device hedge orders for each of the plurality of tradable objects other than the first tradable object at the corresponding hedge price.

8. The method of claim 7, wherein the trading strategy is a spread.

9. The method of claim 7, wherein the first tradable object, the second tradable object, and the third tradable object are the only legs of the trading strategy.

10. The method of claim 7, wherein the difference value is determined by subtracting the filled price from the quoted price.

* * * * *

UNITED STATES PATENT AND TRADEMARK OFFICE
CERTIFICATE OF CORRECTION

| | | |
|---|---|---|
| PATENT NO. | : 8,527,390 B1 | Page 1 of 1 |
| APPLICATION NO. | : 12/410759 | |
| DATED | : September 3, 2013 | |
| INVENTOR(S) | : Mintz et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 703 days.

Signed and Sealed this
Nineteenth Day of May, 2015

Michelle K. Lee
*Director of the United States Patent and Trademark Office*